US008259175B2

(12) United States Patent
Bobbitt et al.

(10) Patent No.: US 8,259,175 B2
(45) Date of Patent: Sep. 4, 2012

(54) OPTIMIZING VIDEO STREAM PROCESSING (75) Inventors: Russell Patrick Bobbitt, Pleasantvile, NY (US); Quanfu Fan, Somerville, MA (US); Sachiko Miyazawa, Bronx, NY (US); Sharathchandra Umapathirao Pankanti, Darien, CT (US); Yun Zhai, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/697,530

(22) Filed: Feb. 1, 2010

(65) Prior Publication Data

US 2011/0188701 A1 Aug. 4, 2011

(51) Int. Cl.
*H04N 7/18* (2006.01)
(52) U.S. Cl. ........ 348/150; 382/100; 709/219; 709/231; 709/232; 706/47; 706/52
(58) Field of Classification Search .................. 348/150; 382/100; 709/219, 231, 232; 706/47, 52
See application file for complete search history.

(56) References Cited

U.S. PATENT DOCUMENTS

| 4,630,110 | A | | 12/1986 | Cotton et al. |
| 5,494,136 | A | * | 2/1996 | Humble .......................... 186/61 |
| 5,883,968 | A | * | 3/1999 | Welch et al. ................... 382/100 |
| 6,571,218 | B1 | | 5/2003 | Sadler |
| 6,974,083 | B1 | * | 12/2005 | Kahn et al. ............... 235/462.14 |
| 7,209,891 | B1 | | 4/2007 | Addy et al. |
| 7,229,012 | B1 | * | 6/2007 | Enright et al. ................. 235/379 |
| 7,416,118 | B2 | * | 8/2008 | Throckmorton et al. ..... 235/383 |
| 7,516,888 | B1 | * | 4/2009 | Kundu et al. .................. 235/383 |
| 7,631,808 | B2 | * | 12/2009 | Kundu et al. .................. 235/383 |
| 7,721,336 | B1 | * | 5/2010 | Adjaoute ........................ 726/25 |

(Continued)

FOREIGN PATENT DOCUMENTS

EP 0664034 B1 11/2001

OTHER PUBLICATIONS

Fan et al., "Detecting Sweethearting in Retail Sureveillance Videos", 2009, Proceeding ICASSP '09 Proceedings of the 2009 IEEE International Conference on Acoustics, Speech and Signal Processing, pp. 1449-1452.*

(Continued)

*Primary Examiner* — John Follansbee
*Assistant Examiner* — Anthony Mejia
(74) *Attorney, Agent, or Firm* — Patrick J. Daugherty; Driggs, Hogg, Daugherty & Del Zoppo Co., LPA (57) ABSTRACT

The present invention involves implementation of an intelligent switching program, whereby the processing power required to monitor check-out stations is considerably reduced. The present invention monitors a subset of check-out stations at any given time, instead of monitoring all check-out stations at all times. The subset of check-out stations is determined dynamically according to, but not limited to, cashier records, input parameters from the user, current lane activity, past lane activity, time of day, etc. Statistical models (e.g., effective population sampling and/or population hypothesis tests) are developed along these lines that guide the lane selection process, whereby increases in the false-negative rate due to failure to monitor particular lanes when events of interest occur are controlled. By monitoring fewer check-out stations, while maintaining target performance accuracy, the amount of data that end users must deal with is significantly reduced.

22 Claims, 7 Drawing Sheets

U.S. PATENT DOCUMENTS

| | | | |
|---|---|---|---|
| 7,962,365 B2* | 6/2011 | Bobbitt et al. | 705/16 |
| 7,965,184 B1* | 6/2011 | Nichols et al. | 340/568.7 |
| 2002/0170782 A1 | 11/2002 | Millikan | |
| 2004/0059614 A1* | 3/2004 | Brown et al. | 705/8 |
| 2005/0102183 A1* | 5/2005 | Kelliher et al. | 705/16 |
| 2005/0146605 A1 | 7/2005 | Lipton et al. | |
| 2006/0190960 A1 | 8/2006 | Barker | |
| 2006/0243798 A1* | 11/2006 | Kundu et al. | 235/383 |
| 2007/0182818 A1* | 8/2007 | Buehler | 348/143 |
| 2007/0253595 A1 | 11/2007 | Sorensen | |
| 2008/0018738 A1 | 1/2008 | Lipton et al. | |
| 2008/0162952 A1 | 7/2008 | Landers et al. | |
| 2008/0184245 A1 | 7/2008 | St-Jean | |
| 2008/0208698 A1* | 8/2008 | Olson et al. | 705/21 |
| 2008/0290182 A1 | 11/2008 | Bell et al. | |
| 2008/0294475 A1 | 11/2008 | Zenor et al. | |
| 2009/0034797 A1 | 2/2009 | Senior | |
| 2009/0076922 A1 | 3/2009 | de Gruil | |
| 2009/0226099 A1* | 9/2009 | Kundu et al. | 382/224 |
| 2009/0234683 A1* | 9/2009 | Anderson et al. | 705/7 |
| 2010/0059589 A1* | 3/2010 | Goncalves et al. | 235/383 |
| 2010/0114623 A1* | 5/2010 | Bobbitt et al. | 705/7 |
| 2010/0134624 A1* | 6/2010 | Bobbitt et al. | 348/150 |
| 2010/0161526 A1* | 6/2010 | Zhang et al. | 706/12 |

OTHER PUBLICATIONS

Venetianer et al., "Video Verification of Point of Sale Transactions", 2007, IEEE Advanced Video and Signal Based Surveillance (AVSS 2007) Conference on Sep. 5-7, 2007, pp. 411-416.*

Nuno Vasconcelos et al, "Statistical Models of Video Structure for Content Analysis and Characterization", IEEE Transaction on Image Processing, IEEE Service Center, Piscataway, NJ, US, vol. 9, No. 1, Jan. 1, 2000.

Qishi Wu et al, "Monitoring Security Events using Integrated Correlation-based Techniques", Proceedings of the 5th Annual Workshop on Cyber Security and Information Intelligence Research Cyber Security and Information Intelligence Challenges and Strategies, CSIIRW '09, Jan. 1, 2009.

International Search Repot for PCT/EP2001/050098 dated Nov. 29, 2011.

Shin, Junsuk, et al, "ASAP: A Camera Sensor Network for Situation Awareness", Springer-Verlag Berlin Heidelberg, Lecture Notes in Computer Science, vol. 4878, 2007, pp. 31 to 47.

* cited by examiner

OPTIMIZING VIDEO STREAM PROCESSING

FIELD OF THE INVENTION

The present invention generally relates to video surveillance, and more particularly relates to using a computer infrastructure to prioritize the processing of multiple video streams.

BACKGROUND

Video surveillance in a retail environment is a common practice. However, it remains resource intensive to process captured video to automatically detect irregular activities. In retail environment, in order to automatically capture irregular activities such as cashier frauds at check-out lanes, sophisticated and resource intensive computerized pattern recognition algorithms need to be executed. By multiplying by the scale of the lanes (10~20 each store and thousands nationwide), a significant amount of computational power is required to handle the huge volume of output generated by complex computer processing.

In addition, each store usually has only limited space and resources to handle all point-of-sale (POS) transactions and associated video streams. Available space may be sufficient for smaller stores that have fewer lanes, but it is not sufficient for larger stores with 15~20 lanes, or even more. At the same time, retailers are not always willing to invest more into the hardware, software and services necessary to keep up with the need.

As a result, if the available computational resources cannot keep up with the need, useful information will be dropped due to this shortage, e.g., frames are dropped in the video streams and/or processing is limited to only a subset of video streams. This may cause many irregular activities to be missed, resulting in severe loss to the retailers.

In view of the foregoing, a need exists to overcome one or more of the deficiencies in the related art.

SUMMARY

In one aspect of the present invention, a method is implemented in a computer infrastructure having computer executable code tangibly embodied on a computer readable storage medium having programming instructions. The method comprises obtaining streams of video and transaction data from one or more hardware devices; combining the streams of video and transaction data into individual transaction units; determining processing priority for each transaction unit of the individual transaction units; and processing a fraction of the individual transaction units based on the priority for each transaction unit.

In another aspect of the present invention, there provides a computer program product comprising a computer readable storage medium having computer readable program code embodied in the storage medium, the computer program product includes at least one module operable to obtain streams of video and transaction data from one or more hardware devices; combine the streams of video and transaction data into individual transaction units; determine processing priority for each transaction unit of the individual transaction units; and process a fraction of the individual transaction units based on the priority for each transaction unit.

In yet another aspect of the present invention, there provides a system for processing video, comprising a memory; and at least one processor coupled to said memory and operative to obtain streams of video and transaction data from one or more hardware devices; combine the streams of video and transaction data into individual transaction units; determine processing priority for each transaction unit of the individual transaction units; and process a fraction of the individual transaction units based on the priority for each transaction unit.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

The present invention generally relates to video surveillance, and more particularly relates to using a computer infrastructure to prioritize the processing of multiple video streams in a retail environment.

Aspects of the invention aim to address the scalability issue encountered in retail stores, where computational power is often insufficient to monitor all check-out lanes simultaneously for irregular activities such as cashier frauds, particularly during periods of high activity (e.g., during the holiday shopping season).

Aspects of the invention involve implementation of an intelligent switching program, whereby the processing power required to monitor check-out stations is considerably reduced. In an embodiment, the present invention monitors a subset of check-out stations at any given time, instead of monitoring all check-out stations at all times. The subset of check-out stations may be determined dynamically according to, but not limited to, cashier records, input parameters from the manager, current lane activity, past lane activity, time of day, etc. Statistical models, e.g., effective population sampling and/or population hypothesis tests, are developed based on the above variables to guide the lane selection process, whereby increases in the false-negative rate due to failure to monitor particular lanes when events of interest occur are controlled. By monitoring fewer check-out stations, while maintaining target performance accuracy, the amount of data that end users must deal with is significantly reduced.

According to an embodiment of the invention, it is assumed that there are N check-out lanes to monitor and a single processing machine equipped with an irregular activity capture module. During any unit time period, e.g., 10 seconds, the system may be able to process a desired number of transactions. Thus, the present invention develops an intelligent switching program for lane selection and dynamically allocates processing power to different lanes from time to time. The system is also capable of dynamically adjusting its allocation based on real-time incoming data.

In an embodiment of the invention, the processing power can be located at a different location from the check-out lanes and can monitor check-out lanes from more than one store at various locations. The processing power can also process historical data along with real-time data.

According to an embodiment of the invention, there may be shared computational resources among different retail stores. For example, a regional or national processing center may provide backup to any overloaded individual store. In this case, each store initially has its own scheduling and prioritization procedures to handle its own transactions. If there are transactions with high priorities that cannot be handled by local computational resources, a request will be sent to the regional or national processing center to process the load. Since different stores may have different problem definitions, the higher level processing unit does not necessarily contain the same analytic modules as individual stores do.

The processing unit at the regional or national processing center may just provide the computational power, while what to compute is defined by the requests sent by the individual stores. The requests sent by the individual stores include the transaction data, video streams and the task definitions. Transaction data refers to data from POS devices including customer number, prices, item numbers, quantities, discounts, voids, etc. The processing units could reside in the same physical location, or they could be in distributed form and be referenced by their virtual/logical addresses.

Further embodiments of the present invention provide an open architecture to integrate processing from different locations as well as different retailers. When the computational resource of one vendor is limited, a higher-level processing unit could allocate free resources from another vendor to assume the burden.

In prioritizing the processing of multiple video streams, the processing power may rely on a set of initial rules that are capable of being dynamically updated. The initial input of the monitoring system may include, but is not limited to: user preference, e.g., Lane 10 is considered sensitive and so should have more focus than other lanes; more focus should be placed on a particular cashier when he or she is on duty; historical data: e.g., the transaction volume on past Sundays, usual time of day, date, day of the week, etc. A set of statistical sampling and population estimation techniques (e.g., hypothesis testing) are employed to further enforce the confidence of the prioritization process.

Based on the initial system input described above, the selective monitoring unit may initiate a statistical sampling process to allocate computational resources, such that the lanes or the lanes occupied by certain cashiers receive more focus than others. The sampling process is based on statistical inference techniques with context-aware (retail) prior information and mathematical models.

In an embodiment of the invention, as the system continues to be provided with new information, it can dynamically adjust its computational resource allocation. To maintain the target capture accuracy, the intelligent switching program may adjust its focus to lanes with a higher processing rate.

The system should have a different profile for different time periods during a day. This could be pre-defined as the initial input. In addition, the volume of particular types of transactions can trigger the intelligent switching program to change focus. For instance, if one lane produces more "void transaction" events than others, the system may adjust its focus to process more transactions from this lane. In other words, if a lane/cashier produces more "candidate" irregular activities such as cashier frauds, the system may put more focus on the lane and/or cashier.

In an embodiment of the invention, the event triggers for the intelligent switching program to switch focus may not be evaluated independently from each other. Rather, they may be modeled as a joint distribution as there may be a strong correlation among them. Common feature models may be used, such as Gaussian, Poisson, exponential, uniform, etc.

Hypothesis tests and statistical sampling processes are carefully designed such that the target irregular activity capture accuracy is maintained, e.g., how many items from a lane and/or a cashier the system should process to maintain a 75% capture rate. This is highly context related, and standard statistical methods are modified to fit an application.

In addition, a prescheduling module determines whether a particular lane should be monitored at any given time based on whether the lane is open. Prior to the processing by the intelligent switching program to prioritize the processing of the video streams, some preprocessing is performed by a preprocessing module on all lanes to produce intermediate transactions. These intermediate transactions provide transaction units for further processing. A transaction unit contains transaction video which corresponds to a set of items purchased by a single customer in a single span of time.

The intermediate features along with prior information are used to decide which transactions should receive prioritized processing (e.g., to catch cashier irregular activity). Results are archived for human perusal and validation.

Figure 1:
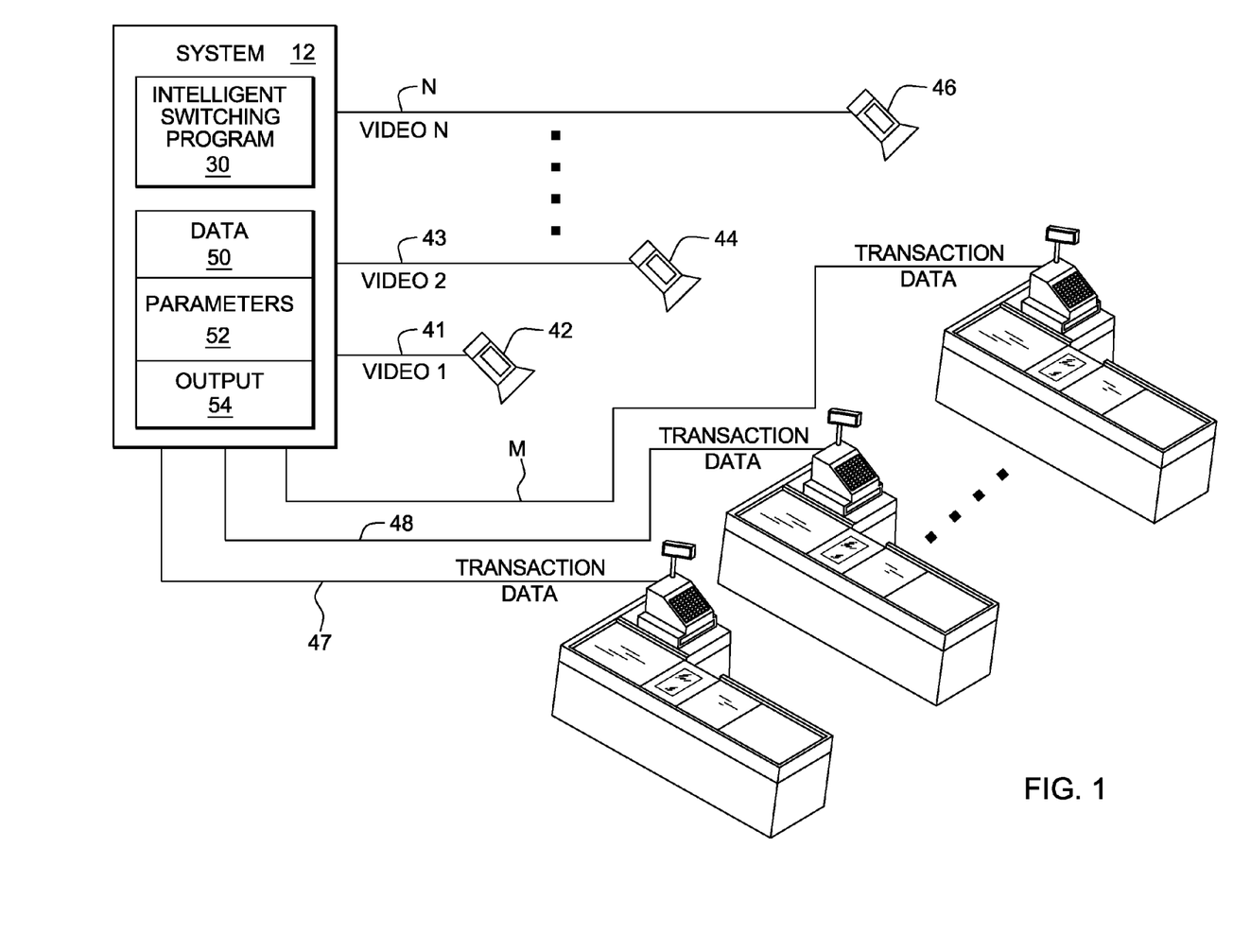
FIG. 1 shows an illustrative environment for a system for prioritizing multiple video streams processing according to an embodiment of the invention.

Turning to the drawings, FIG. 1 shows an illustrative environment for prioritizing the processing of multiple video streams according to an embodiment of the invention. To this extent, at least one camera 42 captures activities in a checkout lane. Camera 44 and camera 46 each capture activities in a different checkout lane. Accordingly, a digital video input 41 from camera 42, a digital video input 43 from camera 44, a digital video input N from camera 46 are obtained and sent to a system 12 that includes, for example, an intelligent switching program 30, data 50, parameters 52, output 54 and/or the like, as discussed herein. Transaction data 47, 48, and M from the each of the checkout lanes are sent to system 12 to be processed.

Figure 2:
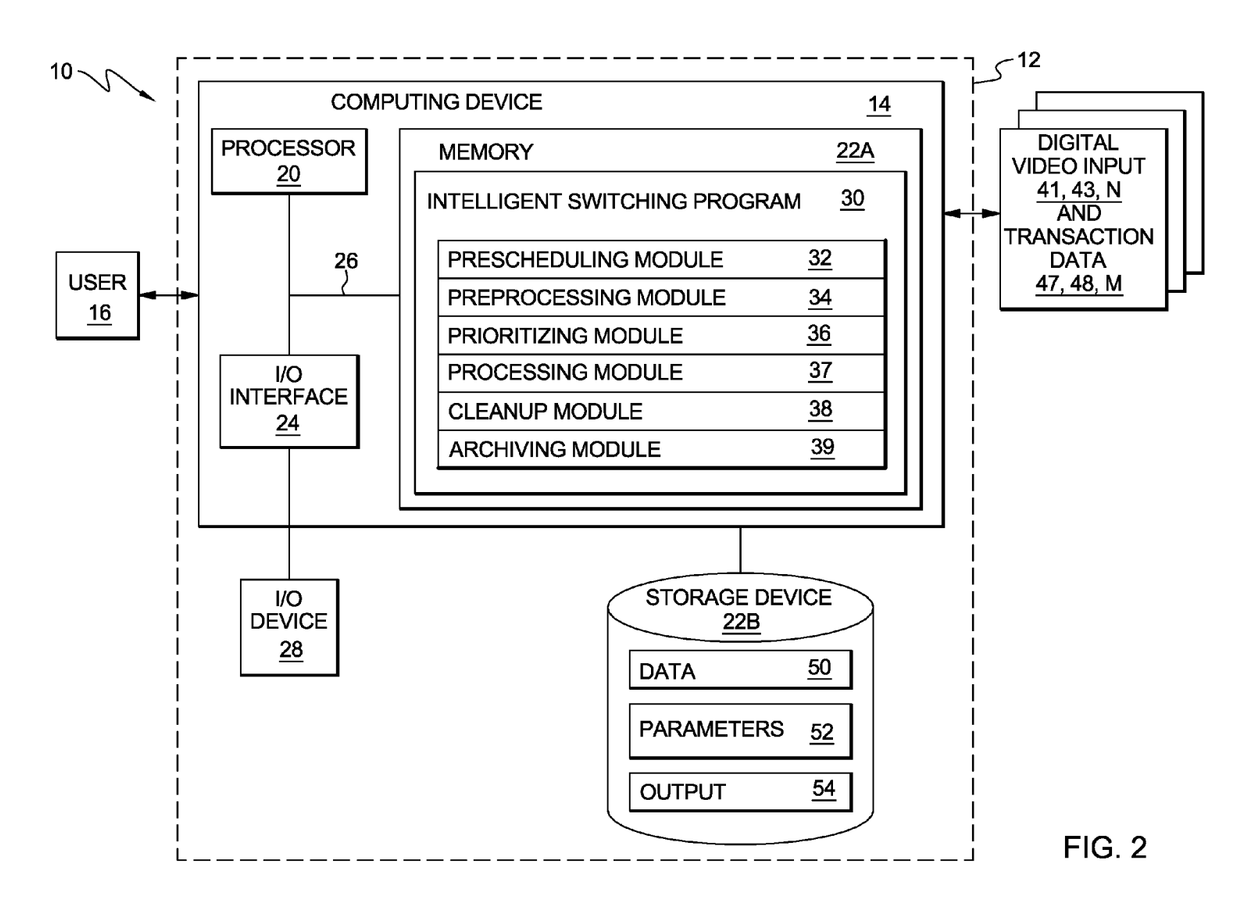
FIG. 2 shows a close up of an illustrative environment for prioritizing multiple video streams processing according to an embodiment of the invention.

FIG. 2 shows a closer view of an illustrative environment 10 for prioritizing the processing of multiple video streams according to an embodiment of the invention. To this extent, environment 10 includes a computer system 12 that can perform the process described herein in order to detect irregular checkout activities. In particular, computer system 12 is shown including a computing device 14 that comprises an intelligent switching program 30, which makes computing device 14 operable for prioritizing the processing of multiple video streams, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as intelligent switching program 30, which is stored in a storage system, such as memory 22A and/or storage device 22B. While executing program code, processor 20 can read and/or write data, such as data 36 to/from memory 22A, storage device 22B, and/or I/O interface 24. Bus 26 provides a communications link between each of the components in computing device 14. I/O device 28 can comprise any device that transfers information between a user 16 and computing device 14 and/or digital video input 41, 43, N and transaction data input 47, 48, M and computing device 14. To this extent, I/O device 28 can comprise a user I/O device to enable an individual user 16 to interact with computing device 14 and/or a communications device to enable an element, such as digital video input 41, 43, N and transaction data input 47, 48, M to communicate with computing device 14 using any type of communications link.

In any event, computing device 14 can comprise any general purpose computing article of manufacture capable of executing program code installed thereon. However, it is understood that computing device 14 and intelligent switching program 30 are only representative of various possible equivalent computing devices that may perform the process described herein. To this extent, in other embodiments, the functionality provided by computing device 14 and intelligent switching program 30 can be implemented by a computing article of manufacture that includes any combination of general and/or specific purpose hardware and/or program code. In each embodiment, the program code and hardware can be created using standard programming and engineering techniques, respectively. Such standard programming and engineering techniques include an open architecture to allow integration of processing from different retailers. Such an open architecture includes cloud computing.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, intelligent switching program 30 enables computer system 12 to detect irregular checkout activities. To this extent, intelligent switching program 30 is shown including a prescheduling module 32, a preprocessing module 34, a prioritizing module 36, a processing module 37, a cleanup module 38, and an archiving module 39. Operation of each of these modules is discussed further herein. However, it is understood that some of the various modules shown in FIG. 2 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 3:
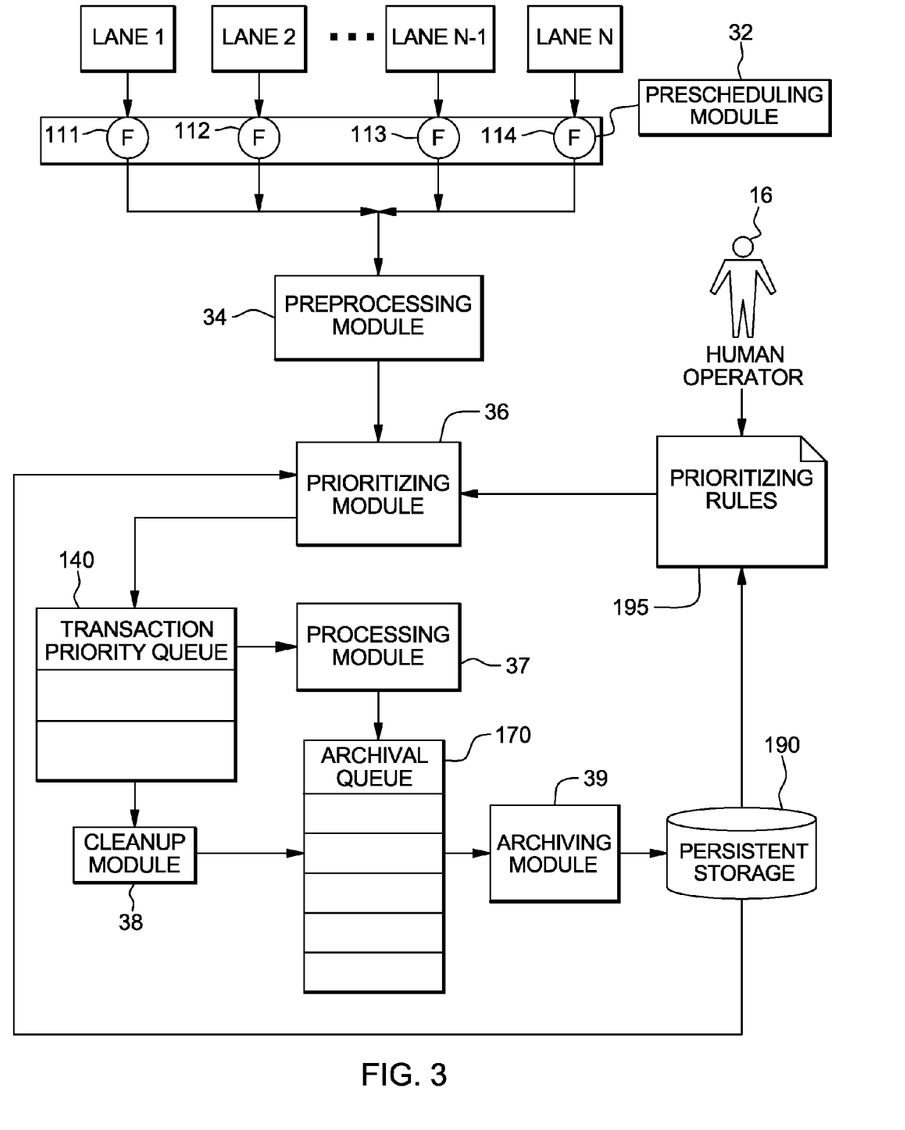
FIG. 3 illustrates a system diagram of an exemplary intelligent switching program according to an embodiment of the invention.

FIG. 3 illustrates a system diagram of an exemplary video transaction intelligent switching program 30 (FIG. 2). The present invention contemplates a plurality of lanes in one or more retail stores. This non-limiting example depicts a system prioritizing the processing of multiple video streams installed in a retail store. To this extent, the retail store maintains an arbitrary number of lanes. Cameras are installed to capture transaction activities at each lane. Transaction data (e.g., prices, item numbers, quantities, etc.) is sent along with video capture of each transaction. The transaction includes both the transaction data and the video stream. This non-limiting example assumes that there are N lanes (lane 1 to lane N) to be processed as determined by a prescheduling module 32 (FIG. 2). In the prescheduling module, a prescheduling filter 111 is installed for lane 1. Likewise, another filter 112 is installed for lane 2, and filter 113 is installed for lane N-1, and filter 114 for lane N.

The prescheduling filters determine whether a transaction from a particular lane should be monitored based on whether the lane is open. All transactions from lanes are sent to the preprocessing module 34 (FIG. 2). The preprocessing module 34 organizes the transactions such that each transaction is isolated and given a unique ID. All transactions are then presented to the prioritizing module 36. The prioritizing module 36 uses predetermined rules, which are also capable of being dynamically updated, to calculate a priority score for each transaction.

The prioritizing module 36 maintains a transaction priority queue 140, which contains transactions with priority scores. Transactions are listed in the transaction priority queue 140 in the order of their priority score. The processing module 37 processes transactions with the highest priority score first from the transaction priority queue 140. The processing module 37 contains the relatively computationally-intensive irregular activity detection software to analyze each transaction to discover whether irregular activity has occurred for that particular transaction. As a transaction is processed by the processing module 37, the transaction unit for that transaction is moved to an archival queue 170.

A cleanup module 38 monitors the transaction priority queue 140 at regular time intervals. If a transaction has been in the transaction priority queue 140 for more than a predetermined amount of time (e.g., 10 seconds) and the priority score for the transaction is low, the cleanup module 38 will move the transaction to the archival queue 170.

The archiving module 39 processes transaction units in the archival queue 170 by moving the transaction units in the archival queue 170 to persistent storage 190. From persistent storage 190, data can be extracted to form part of prioritizing rules 195. Human operator 16 can also provide prioritizing rules 195. Prioritizing rules 195 are used by the prioritizing module 36 to prioritize transactions.

Figure 4A:
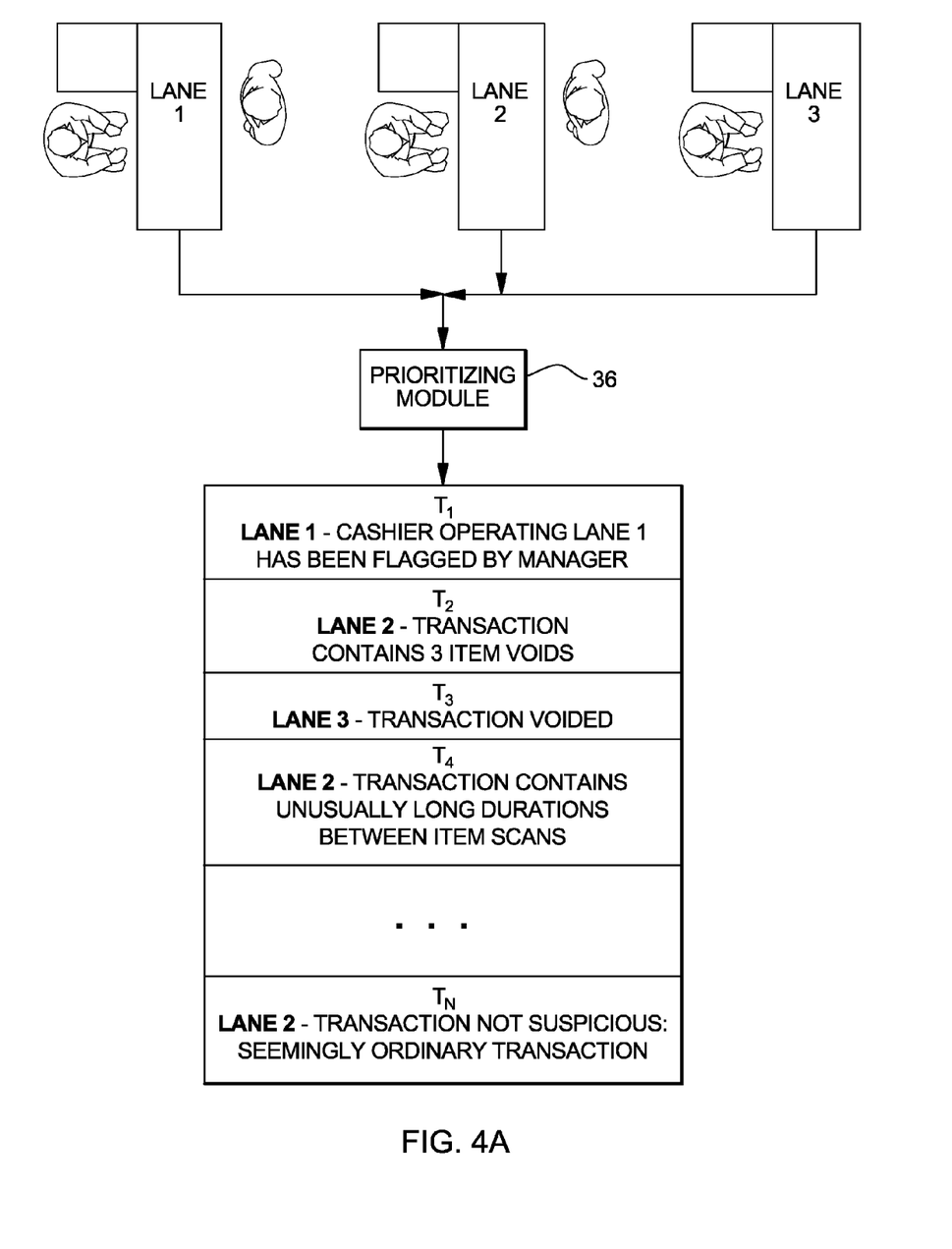
FIGS. 4A and 4B illustrate examples of calculating priorities for different transaction units.
Figure 4B:
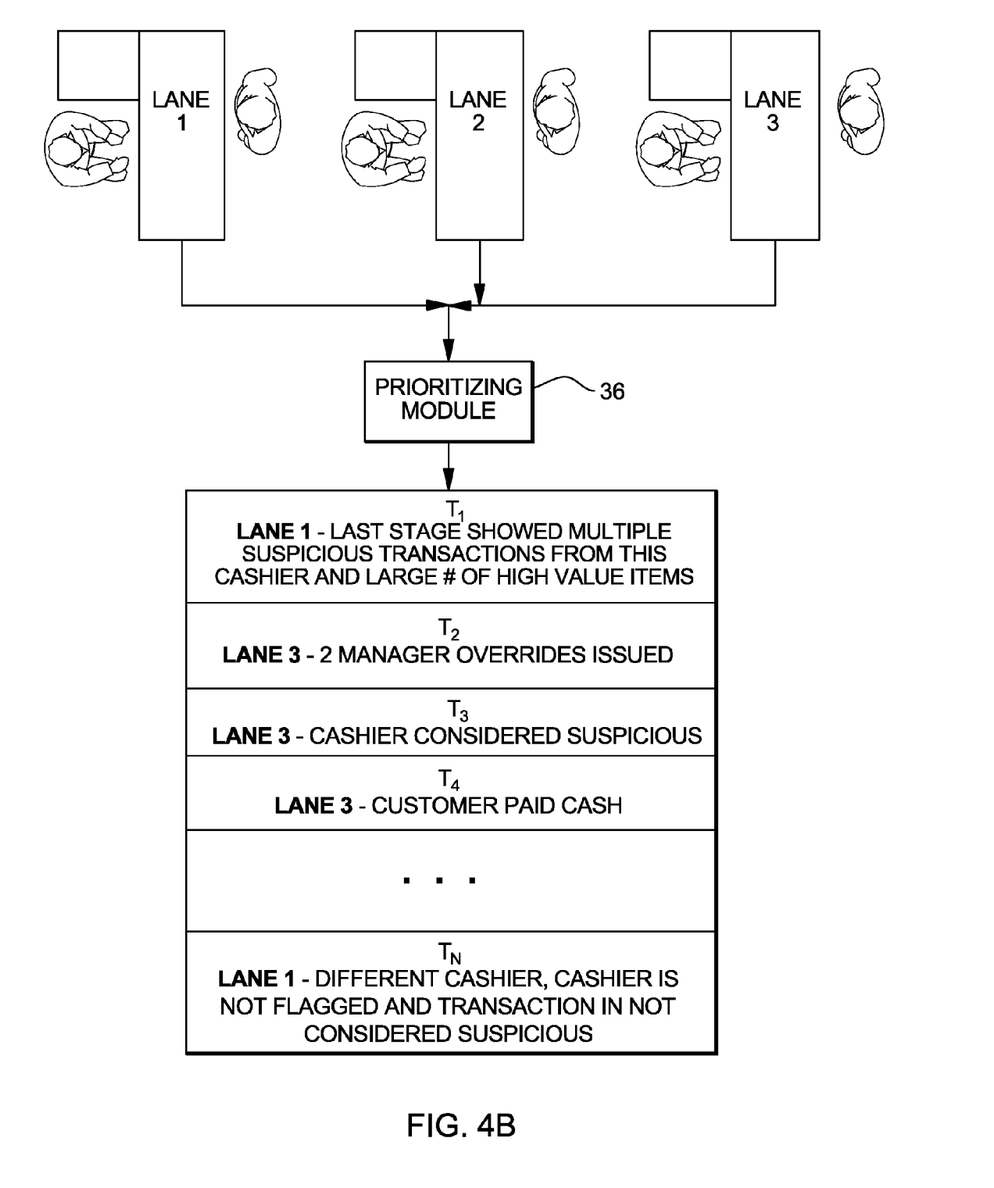

According to an embodiment of the invention, when the processing module 37 has unused capacity (e.g., late at night when there are few customers or when the store is closed), unprocessed transactions from the persistent storage 190 can be sent back to the prioritizing module 36 to be reprocessed FIGS. 4A and 4B illustrate two stages of priority setting among transactions. FIG. 4A illustrates a first stage of prioritizing transactions. In this first stage, transactions from Lanes 1-3 are sent to the prioritizing module 36. Based on the prioritizing rules provided by human operator 16 and the characteristics of each transaction, the prioritizing module 36 prioritizes transactions in the order of $T_1$ to $T_N$ with $T_1$ having the highest priority.

For example, $T_1$ from Lane 1 has the highest priority because the cashier operating Lane 1 has been flagged by the manager. $T_2$ from Lane 2 is given a high priority because the transaction contains three voided items. $T_3$ from Lane 3 is also given a high priority because the entire transaction is voided. However, the priority given to $T_2$ is higher than that of $T_3$ because three voided items in a single transaction is considered a more irregular activity than voiding an entire transaction, according to the system rule design. $T_4$ from Lane 2 is given a high priority because the transaction contains unusually long durations between item scans. Long durations between scans is a possible cue that the cashier is moving items from the entry belt to the exit belt without entering the items into the transaction between items that are being entered into the transaction (i.e., the items are bagged and taken away by the customer without being purchased). There are many other reasons for long durations between items (e.g., the cashier stops to bag items), so $T_4$ is given a lower priority than $T_1$-$T_3$. In comparison, $T_N$ from Lane 2 is given low priority because is it s a seemingly ordinary transaction.

FIG. 4B illustrates a second stage of prioritizing transactions. In this second stage, the prioritizing rules have been updated with the transaction data from the first stage. In the first stage, the cashier from Lane 2 issued multiple suspicious transactions. As a result, the prioritizing rules were updated based on this information.

In the second stage as illustrated by FIG. 4B, new transactions $T_1$ to $T_N$ are processed by the prioritizing module 36. $T_1$ from Lane 2 is given top priority because the first stage showed multiple suspicious transactions from the same cashier and a large number of high value items. $T_2$ from Lane 3 is given a high priority because the same cashier from Lane 3 had two managerial overwrites issued. $T_3$ from Lane 3 is given high priority because the same cashier is considered suspicious. $T_4$ is given high priority because a customer pays cash. Paying in cash means that the identity of buyer is not recorded as it would be, for example, in a credit card transaction, so there is a correlation between cash purchases and fraud. However, the correlation is not very strong relative to the items that are prioritized ahead of it. $T_N$ is given low priority because a different cashier now works at Lane 1 and the cashier is not flagged as suspicious. In addition, the transaction $T_N$ is an ordinary, non-suspicious transaction.

Figure 5:
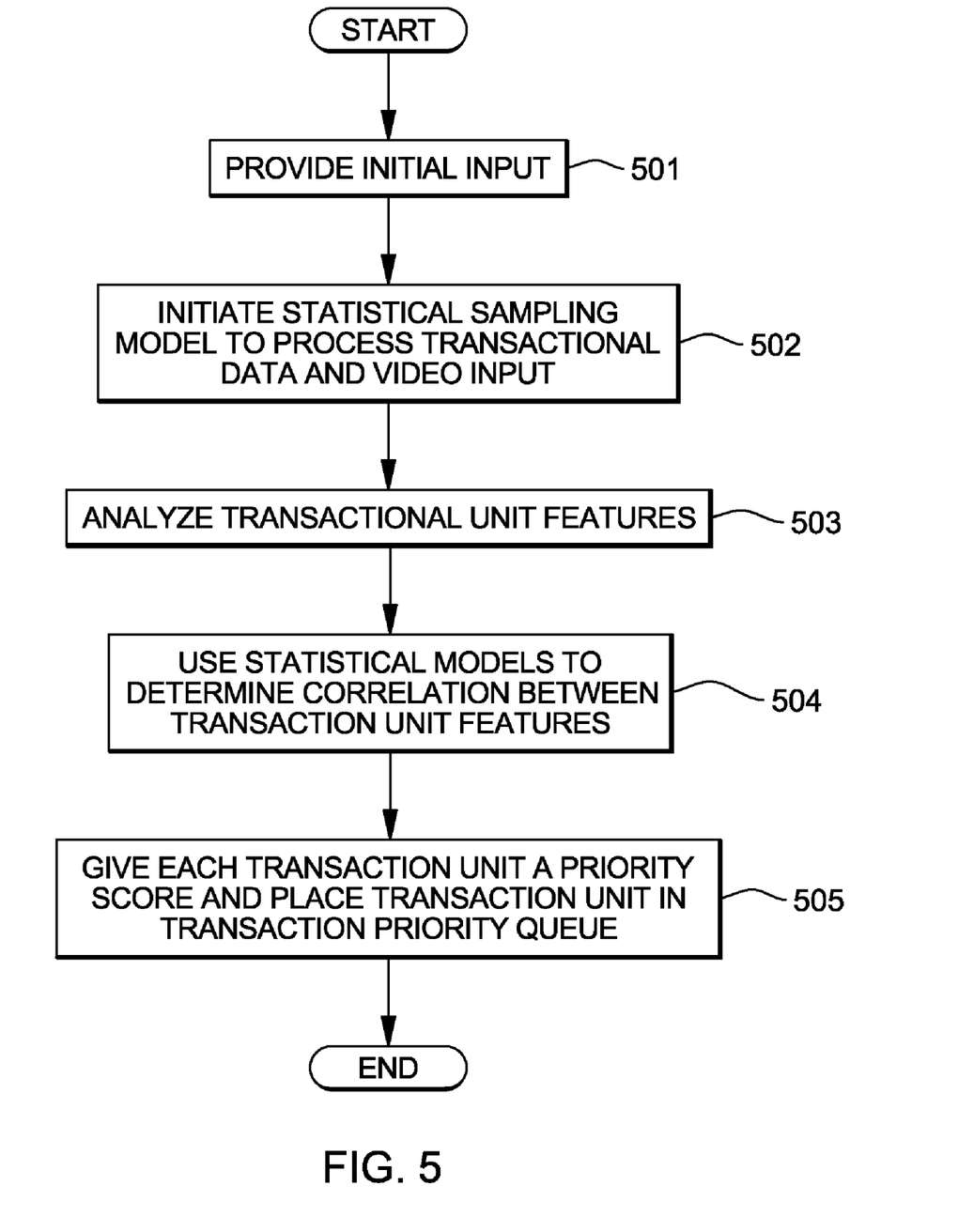
FIG. 5 illustrates a flowchart for exemplary steps of prioritizing multiple video streams processing according to an embodiment of the invention.

FIG. 5 illustrates a flowchart for exemplary steps of assigning priorities for transaction units. In step 501, the intelligent switching program takes initial input for assigning priorities. In step 502, the intelligent switching program initiates a statistical sampling model to process transactional data and video stream, which is combined into a transaction unit. In step 503, the intelligent switching program analyzes features of each transaction unit. The features includes but are not limited to: activity level at each lane, e.g., can be obtained by analyzing the object detection and tracking algorithms; volume of transactions in terms of both number of transactions and monetary amounts; and results of irregular activity detections in the near history which is also used to update the historical data to affect future transaction priority ordering. In step 504, the intelligent system uses statistical models (e.g., Gaussian, Poisson, exponential, uniform, etc) to determine correlations between features of the transaction units. In step 505, each transaction unit is given a priority score based on analysis results and placed in the transaction priority queue.

Figure 6:
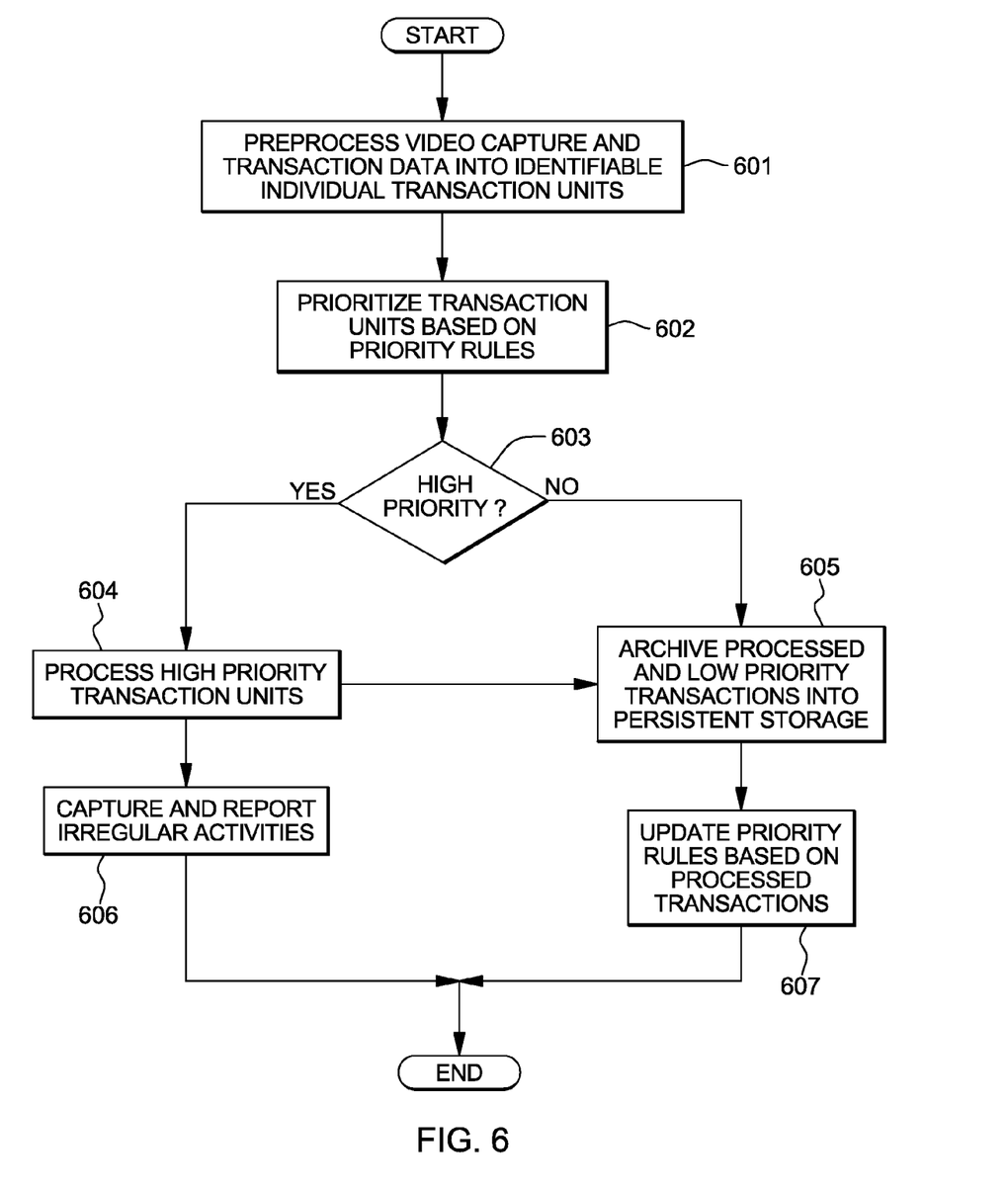
FIG. 6 illustrates a flowchart for exemplary steps of assigning priorities for multiple video streams.

FIG. 6 illustrates a flowchart for exemplary steps of processing transactions according to the present invention. In step 601, the monitoring system preprocesses video capture and transaction data and turns them into identifiable individual transaction units. In step 602, the prioritizing system prioritizes the individual transaction units based on priority rules. In step 603, the system determines whether a transaction unit has high enough priority to be processed. If the transaction unit has relatively high priority, the transaction is processed in step 604. If the transaction unit does not have high priority in step 603, the transaction unit is archived directly in step 605. After the transaction unit is processed in step 604, irregular activities are captured and reported in step 606. Processed transactions from step 604 are also archived in step 605. An analysis of all transactions from step 605 provides the basis for updating prioritizing rules in step 607.

What is claimed is:

1. A method, comprising:

obtaining by a processor streams of video and transaction data captured from each of a plurality of different checkout lanes;

combining by the processor the streams of video and transaction data for each respective one of the different checkout lanes into individual transaction units that each comprise transaction video corresponding to a set of items purchased by a single customer at one of the different checkout lanes in a single span of time;

determining processing priority by the processor for each transaction unit of the individual transaction units as a function of a lane priority value of a respective one of the different checkout lanes that the transaction unit video and transaction data is captured from, wherein each of the different checkout lanes have a different lane priority value, and as a function of a transaction unit type priority value of a type of transaction unit indicated by the transaction data of the transaction unit, wherein the transaction unit type is selected from a plurality of different transaction unit types that each have a different transaction unit type priority value; and processing by the processor a high priority fraction of a total of the individual transaction units based on the determined processing priority for each of the transaction units to automatically detect irregular activities indicated by the transaction unit video and the transaction data of the processed transaction units.

2. The method of claim 1, wherein the different transaction unit types comprise:

a first transaction unit type comprising at least one voided item within a transaction;

a second transaction unit type comprising a voiding of all items within a single transaction; and a third transaction unit type comprising a long time duration between item scans in a single transaction.

3. The method of claim 2, further comprising:

the processor dynamically updating and increasing the lane priority value of a first of the different checkout lanes as a function of the processing of the high priority fraction individual transaction unit transaction data automatically detecting irregular activities within processed transaction unit video and the transaction data captured from the first checkout lane; and subsequently determining processing priority by the processor for each transaction unit of the individual transaction units captured from the different checkout lanes as a function of the updated lane priority value of the first checkout lane.

4. The method of claim 3, wherein the determining processing priority for each transaction unit comprises using one or more statistical models to determine correlations between features of the transaction unit.

5. The method of claim 4, wherein one or more statistical models comprises Gaussian, Poisson, exponential, uniform or other statistical models.

6. The method of claim 5, further comprising archiving by the processor a low priority remainder fraction of the total of the individual transaction units that each have a lower priority than the high priority fraction individual transaction units based on the determined processing priority.

7. The method of claim 6, wherein the step of determining processing priority by the processor for each transaction unit of the individual transaction units further comprises placing the transactions units in a transaction priority queue in an order of relative priority.

8. The method of claim 7, wherein the step of the processor archiving the low priority remainder fraction of the total of the individual transaction units further comprises moving the low priority remainder fraction transaction units from the transaction priority queue to an archival queue in an order of relative priority.

9. The method of claim 8, further comprising the processor moving unprocessed transaction units from the transaction priority queue to the archival queue at regular intervals.

10. The method of claim 9, further comprising the processor processing the low priority remainder fraction individual transaction units archived in the archival queue in order of their relative queued priority to automatically detect irregular activities indicated by the transaction unit video and the transaction data of the processed transaction units when the processor has unused capacity.

11. A method for providing a service for automatically detecting irregular activities indicated by the transaction unit video and transaction data, the method comprising:
   integrating computer-readable program code into a computer system comprising a processor, a computer readable memory and a computer readable tangible storage device, wherein the computer readable program code is embodied on the computer readable tangible storage device and comprises instructions that, when executed by the processor via the computer readable memory, cause the processor to:
   obtain streams of video and transaction data captured from each of a plurality of different checkout lanes;
   combine the streams of video and transaction data for each respective one of the different checkout lanes into individual transaction units that each comprise transaction video corresponding to a set of items purchased by a single customer at one of the different checkout lanes in a single span of time;
   determine processing priority for each transaction unit of the individual transaction units as a function of a lane priority value of a respective one of the different checkout lanes that the transaction unit video and transaction data is captured from, wherein each of the different checkout lanes have a different lane priority value, and as a function of a transaction unit type priority value of a type of transaction unit indicated by the transaction data of the transaction unit, wherein the transaction unit type is selected from a plurality of different transaction unit types that each have a different transaction unit type priority value; and
   process a high priority fraction of a total of the individual transaction units based on the determined processing priority for each of the transaction units to automatically detect irregular activities indicated by the transaction unit video and the transaction data of the processed transaction units.

12. The method of claim 11, wherein the processor, when executing the program instructions stored on the tangible computer-readable storage device via the computer readable memory, further:
   dynamically updates and increases the lane priority value of a first of the different checkout lanes as a function of the processing of the high priority fraction individual transaction unit transaction data automatically detecting irregular activities within processed transaction unit video and the transaction data captured from the first checkout lane; and
   subsequently determines processing priority for each transaction unit of the individual transaction units captured from the different checkout lanes as a function of the updated lane priority value of the first checkout lane.

13. The method of claim 12, wherein the processor, when executing the program instructions stored on the tangible computer-readable storage device via the computer readable memory, further archives a low priority remainder fraction of the total of the individual transaction units that each have a lower priority than the high priority fraction individual transaction units based on the determined processing priority.

14. The method of claim 13, wherein the processor, when executing the program instructions stored on the tangible computer-readable storage device via the computer readable memory, further processes the archived low priority remainder fraction individual transaction units in order of their relative queued priority to automatically detect irregular activities indicated by the transaction unit video and the transaction data of the processed transaction units when the processor has unused capacity.

15. A system, comprising:
   a processor in communication with a computer readable memory and a tangible computer-readable storage device;
   wherein the processor, when executing program instructions stored on the tangible computer-readable storage device via the computer readable memory:
   obtains streams of video and transaction data captured from each of a plurality of different checkout lanes;
   combines the streams of video and transaction data for each respective one of the different checkout lanes into individual transaction units that each comprise transaction video corresponding to a set of items purchased by a single customer at one of the different checkout lanes in a single span of time;
   determines processing priority for each transaction unit of the individual transaction units as a function of a lane priority value of a respective one of the different checkout lanes that the transaction unit video and transaction data is captured from, wherein each of the different checkout lanes have a different lane priority value, and as a function of a transaction unit type priority value of a type of transaction unit indicated by the transaction data of the transaction unit, wherein the transaction unit type is selected from a plurality of different transaction unit types that each have a different transaction unit type priority value; and
   processes a high priority fraction of a total of the individual transaction units based on the determined processing priority for each of the transaction units to automatically detect irregular activities indicated by the transaction unit video and the transaction data of the processed transaction units.

16. The system of claim 15, wherein the processor, when executing the program instructions stored on the computer-readable storage device via the computer readable memory, further:
   dynamically updates and increases the lane priority value of a first of the different checkout lanes as a function of the processing of the high priority fraction individual transaction unit transaction data automatically detecting irregular activities within processed transaction unit video and the transaction data captured from the first checkout lane; and
   subsequently determines processing priority for each transaction unit of the individual transaction units captured from the different checkout lanes as a function of the updated lane priority value of the first checkout lane.

17. The system of claim 16, wherein the processor, when executing the program instructions stored on the computer-readable storage device via the computer readable memory, further archives a low priority remainder fraction of the total of the individual transaction units that each have a lower priority than the high priority fraction individual transaction units based on the determined processing priority.

18. The system of claim 17, wherein the processor, when executing the program instructions stored on the computer-readable storage device via the computer readable memory, further processes the archived low priority remainder fraction individual transaction units in order of their relative queued priority to automatically detect irregular activities indicated by the transaction unit video and the transaction data of the processed transaction units, when the system has unused capacity.

19. An article of manufacture, comprising:
   a computer readable tangible storage device having computer readable program code embodied therewith, the computer readable program code comprising instructions that, when executed by a computer processor, cause the computer processor to:
   obtain streams of video and transaction data captured from each of a plurality of different checkout lanes;
   combine the streams of video and transaction data for each respective one of the different checkout lanes into individual transaction units that each comprise transaction video corresponding to a set of items purchased by a single customer at one of the different checkout lanes in a single span of time;
   determine processing priority for each transaction unit of the individual transaction units as a function of a lane priority value of a respective one of the different checkout lanes that the transaction unit video and transaction data is captured from, wherein each of the different checkout lanes have a different lane priority value, and as a function of a transaction unit type priority value of a type of transaction unit indicated by the transaction data of the transaction unit, wherein the transaction unit type is selected from a plurality of different transaction unit types that each have a different transaction unit type priority value; and
   process a high priority fraction of a total of the individual transaction units based on the determined processing priority for each of the transaction units to automatically detect irregular activities indicated by the transaction unit video and the transaction data of the processed transaction units.

20. The article of manufacture of claim 19, wherein the computer readable program code instructions, when executed by the computer processor, further cause the processor to:
   dynamically update and increase the lane priority value of a first of the different checkout lanes as a function of the processing of the high priority fraction individual transaction unit transaction data automatically detecting irregular activities within processed transaction unit video and the transaction data captured from the first checkout lane; and
   subsequently determine processing priority for each transaction unit of the individual transaction units captured from the different checkout lanes as a function of the updated lane priority value of the first checkout lane.

21. The article of manufacture of claim 20, wherein the computer readable program code instructions, when executed by the computer processor, further cause the processor to archive a low priority remainder fraction of the total of the individual transaction units that each have a lower priority than the high priority fraction individual transaction units based on the determined processing priority.

22. The article of manufacture of claim 21, wherein the computer readable program code instructions, when executed by the computer processor, further cause the processor to process the archived low priority remainder fraction individual transaction units in order of their relative queued priority to automatically detect irregular activities indicated by the transaction unit video and the transaction data of the processed transaction units, when the processor has unused capacity.

* * * * *